(12) United States Patent
Wei et al.

(10) Patent No.: US 7,850,088 B2
(45) Date of Patent: Dec. 14, 2010

(54) THERMOSTATIC WATER MIXING VALVE

(75) Inventors: Wu Wei, Xiamen (CN); Keping Li, Jiujiang (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 761 days.

(21) Appl. No.: 11/651,802

(22) Filed: Jan. 9, 2007

(65) Prior Publication Data

US 2008/0164330 A1     Jul. 10, 2008

(51) Int. Cl.
*G05D 23/13* (2006.01)
*G05D 23/185* (2006.01)
*A01G 25/16* (2006.01)
*F16K 11/078* (2006.01)

(52) U.S. Cl. ............... 236/12.1; 236/12.11; 236/12.16; 236/12.19; 236/12.23; 236/93 A; 137/625; 137/625.4

(58) Field of Classification Search ..... 236/12.1–12.23, 236/93 A; 137/625, 625.4
See application file for complete search history.

(56) References Cited

U.S. PATENT DOCUMENTS

| | | | |
|---|---|---|---|
| 5,299,593 A | 4/1994 | Ottelli | |
| 5,340,018 A | 8/1994 | MacDonald | |
| 6,089,462 A | 7/2000 | Osvaldo | |
| 6,517,006 B1 * | 2/2003 | Knapp | ....................... 236/12.2 |
| 2002/0059953 A1 * | 5/2002 | Tarzia | .......................... 137/98 |
| 2004/0016815 A1 * | 1/2004 | Bergmann et al. | ....... 236/12.11 |

* cited by examiner

*Primary Examiner*—Frantz F Jules
*Assistant Examiner*—Travis Ruby
(74) *Attorney, Agent, or Firm*—McDermott Will & Emery LLP

(57) ABSTRACT

The present invention is directed to a thermostatic water mixing valve having a sub-base coupled to a base, both having a hot water inlet, a cold water inlet and a mixed water outlet. A disk assembly including a lower or stationary disk and an upper or rotatable disk are positioned on the base. The lower disk also has a peripheral notch that receives an extent of an engaging member that extends from a sidewall of the base, while the upper disk has a peripheral cavity that also receives an extent of the engaging member. A cap is coupled to the upper disk, wherein the cap and the upper disk rotate as a unit with respect to the lower disk. The cap has a hot water cavity and cold water cavity positioned about a central opening. A cartridge assembly includes a collar with at least one aperture aligned with the cold water cavity of the cap and a depending skirt with at least one aperture aligned with the hot water cavity of the cap. An mixing chamber receives both hot water flowing from the hot water cavity through at least one aperture in the skirt and cold water flowing from the cold water cavity through both the aperture in the collar and at least one aperture in the slide bolt. Mixed water is discharged from the mixing chamber through the water outlets in the base and the sub-base.

35 Claims, 14 Drawing Sheets

THERMOSTATIC WATER MIXING VALVE

CROSS-REFERENCE TO RELATED APPLICATIONS

N/A

FEDERALLY SPONSORED RESEARCH OR DEVELOPMENT

N/A

TECHNICAL FIELD

The invention relates to a thermostatic mixing valve for water faucets. More specifically, the invention provides a thermostatic mixing valve with disparate hot and cold water cavities and water flow paths, a unique cartridge assembly, and a pair of disks with peripheral structures that facilitate rotation of one disk with respect to the other disk.

BACKGROUND OF THE INVENTION

Thermostatic water mixing valves are well-known, and can be found in both residential and commercial settings. In either setting, the mixing valve combines two water flows, primarily hot and cold water flows, into a stream of mixed temperature water for discharge from the mixing valve and through a faucet. While such conventional mixing valves provide some benefits, including regulated water outlet flow, they nevertheless have certain limitations. For example, the internal components of conventional mixing valves wear prematurely, which reduces ease of operation and the life of the valve. Also, conventional mixing valves are susceptible to imprecise temperature control of the mixed water which is discharged from the faucet to which the mixing valve is operably connected. Examples of conventional mixing valve having these limitations are found in U.S. Pat. No. 5,299,593 to Ottelli; U.S. Pat. No. 5,340,018 to MacDonald; and, U.S. Pat. No. 6,089,462 to Osvaldo.

The present invention is provided to solve the limitations of conventional mixing valves discussed above and other problems, and to provide advantages and aspects not provided by prior mixing valves. A full discussion of the features and advantages of the present invention is deferred to the following detailed description, which precedes with reference to the accompanying drawings.

SUMMARY OF THE INVENTION

The present invention is directed to a thermostatic water mixing valve. The mixing valve includes a number of internal structures that interact to define a hot water flow path, a cold water flow path, and an outlet flow path. These interacting structures enable the mixing valve to discharge to the faucet a mixed water composition having the flow volume and temperature desired by the operator of the faucet.

According to one aspect of the invention, the mixing valve includes a base. A stationary or lower disk is positioned on the base, and a rotatable or upper disk is positioned above the stationary disk. The mixing valve also includes a cartridge assembly and a cap, wherein the cap is positioned between the upper disk and a collar of the cartridge assembly. The base includes a sidewall with an upwardly extending engaging member for the stationary and rotatable disks. The engaging member comprises a pedestal that extends into a notch in the stationary disk and a finger that extends from the pedestal into a channel in the rotatable disk. During rotation of the disks, the peripheral finger slidably moves within the channel. The base includes a cavity that along with a cavity in a sub-base collectively define a receiver for a pressure balancing assembly. Thus, the pressure balancing assembly is cradled by structures of both the base and the sub-base According to another aspect of the invention, The stationary or lower disk and the rotatable or upper disk comprise a stacked disk assembly. The stationary disk includes a central opening that accommodates a lower extent of the cartridge assembly, as well as a hot water inlet opening and a cold water inlet opening positioned radially outward of the central opening. The rotatable disk includes a central opening that also accommodates a lower extent of the cartridge assembly, in addition to a hot water inlet opening and a cold water inlet that are positioned radially outward of the central opening. The channel is formed in the peripheral sidewall of the rotatable disk, and a hood defines the upper boundary of the channel.

According to yet another aspect of the invention, the cap that couples with the rotatable disk has a generally annular body with a central opening that receives a portion of the cartridge assembly. The cap has a cavity arrangement comprising a hot water cavity and a cold water cavity. While the hot water cavity is bounded by a top wall of the cap, the cold water cavity extends vertically through the cap. The cartridge assembly comprises a collar that includes a flange with at least one aperture that forms a cold water inlet and that is alignable with the cold water cavity. The collar also includes a skirt that depends from the flange, wherein the skirt is tubular to accommodate a temperature sensor. An upper portion of the skirt has at least one aperture that forms a hot water inlet and that is alignable with the hot water cavity. The cartridge assembly further includes a slide bolt that is positioned within the collar and that includes a central opening that receives the temperature sensor. The slide bolt has an upper circumferential lip that resides within a void between a flange of the spindle regulator and the collar. Radially inward of the lip, the slide bolt has at least one aperture that forms a cold water inlet that receives cold water flowing through the cold water inlet of the collar flange.

According to yet another aspect of the invention, a water mixing chamber is defined in the tubular region between the temperature sensor and the slide bolt and collar. The mixing chamber receives hot and cold water flows to provide a mixed water composition that is discharged from the mixing valve to the faucet. To accomplish this, the mixing chamber discharges a mixed water composition through the mixed water outlets in the base and sub-base. The temperature sensor is a temperature sensitive element that expands or contracts depending upon the temperature of the water composition in the mixing chamber.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
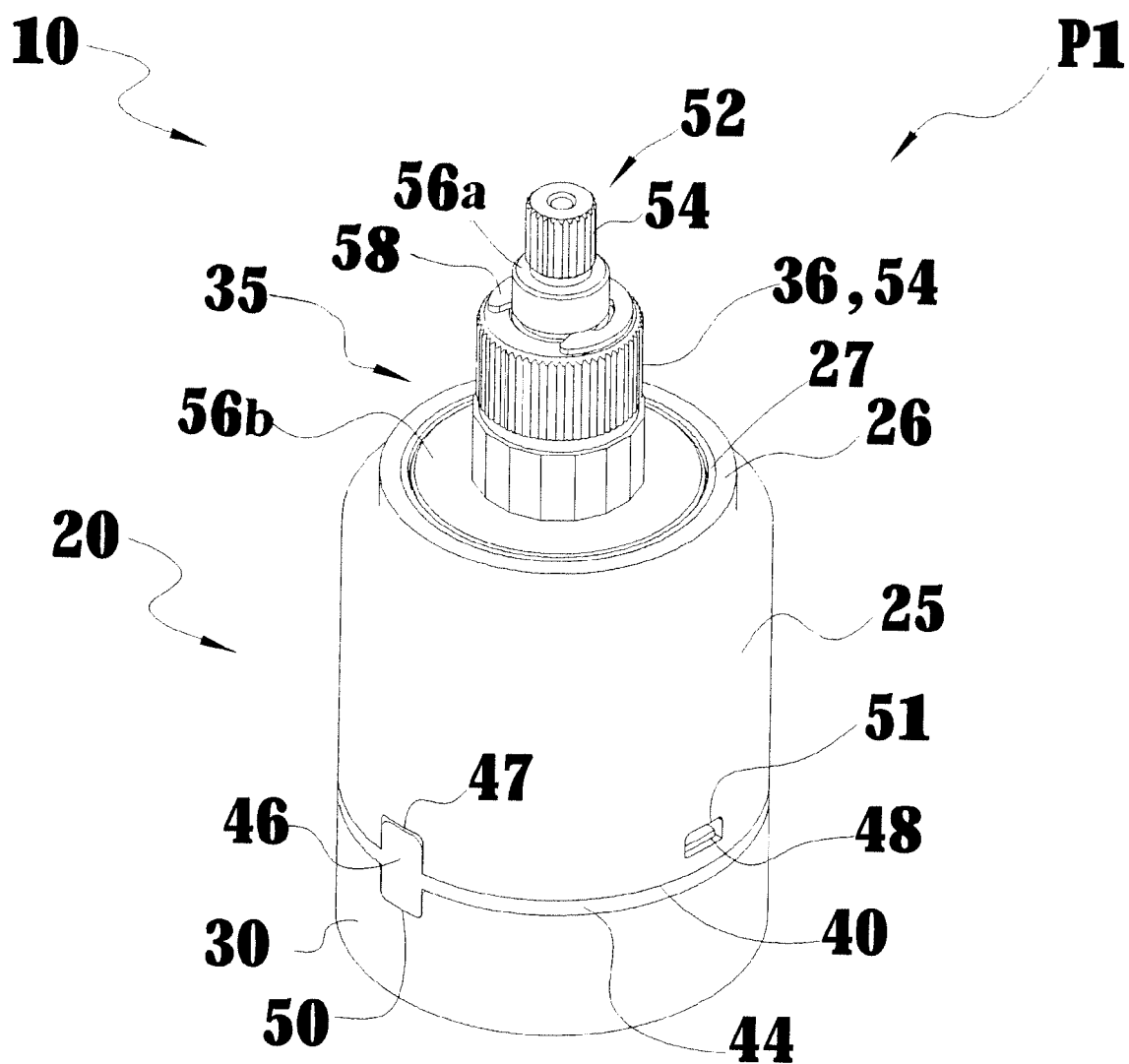
FIG. 1 is a perspective view of mixing valve of the invention, showing the mixing valve in an assembled position.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIGS. 1-10 depict a thermostatic water mixing valve 10 of the invention. As explained in greater detail below, the mixing valve 10 includes a number of internal structures that interact to define a hot water flow path $F_H$, a cold water flow path $F_C$, and an outlet flow path. These interacting structures enable the mixing valve 10 to discharge to the faucet a mixed water composition having the flow volume and temperature desired by the operator of the faucet.

The mixing valve 10 comprises a housing assembly 20 that includes a cover 25 connected to a sub-base 30, wherein a cartridge assembly 35 extends through the cover. In the embodiment of FIG. 1, a base 40 is positioned between the cover 25 and the sub-base 30, wherein the base 40 is "sandwiched" between the cover 25 and the sub-base 40. The sub-base 30 and the base 40 collective define a support assembly 41 for the other components of the mixing valve 10, including the cartridge assembly 35. The base 40 includes a sidewall 42 with an outwardly extending groove 44, a number of circumferentially spaced projections 46, and at least one tab 48 that facilitate connection of the housing assembly 20. In the assembled position P1 of FIG. 1, the projection 46 is received by a recess 47 of the cover 25 and a recess 50 in the sub-base 30, and the tab 48 is received by an opening 51 of the cover 25. As explained below, elongated fasteners 22 may be utilized to further secure the housing assembly 20 in the assembled position P1. An upper extent of the cover 25 includes a neck 26 that defines an opening 27 through which the cartridge assembly 35 extends. A spindle regulator 36 of the cartridge assembly 35 is visible through the cover opening 27. A rotatable spindle assembly 38 extends upward from the spindle regulator 36. The spindle assembly 38 includes a spindle 52 with external threads 54 and flange 56a, b. A retaining element 58, such as a garter spring, is positioned between a lower edge of the flange 56a and an upper edge of the spindle regulator 36. When the mixing valve 10 is installed within a faucet, the spindle regulator 36 engages and rotates with the faucet lever that the operator actuates, by rotation, to select the desired water temperature flowing from the faucet.

Figure 2:
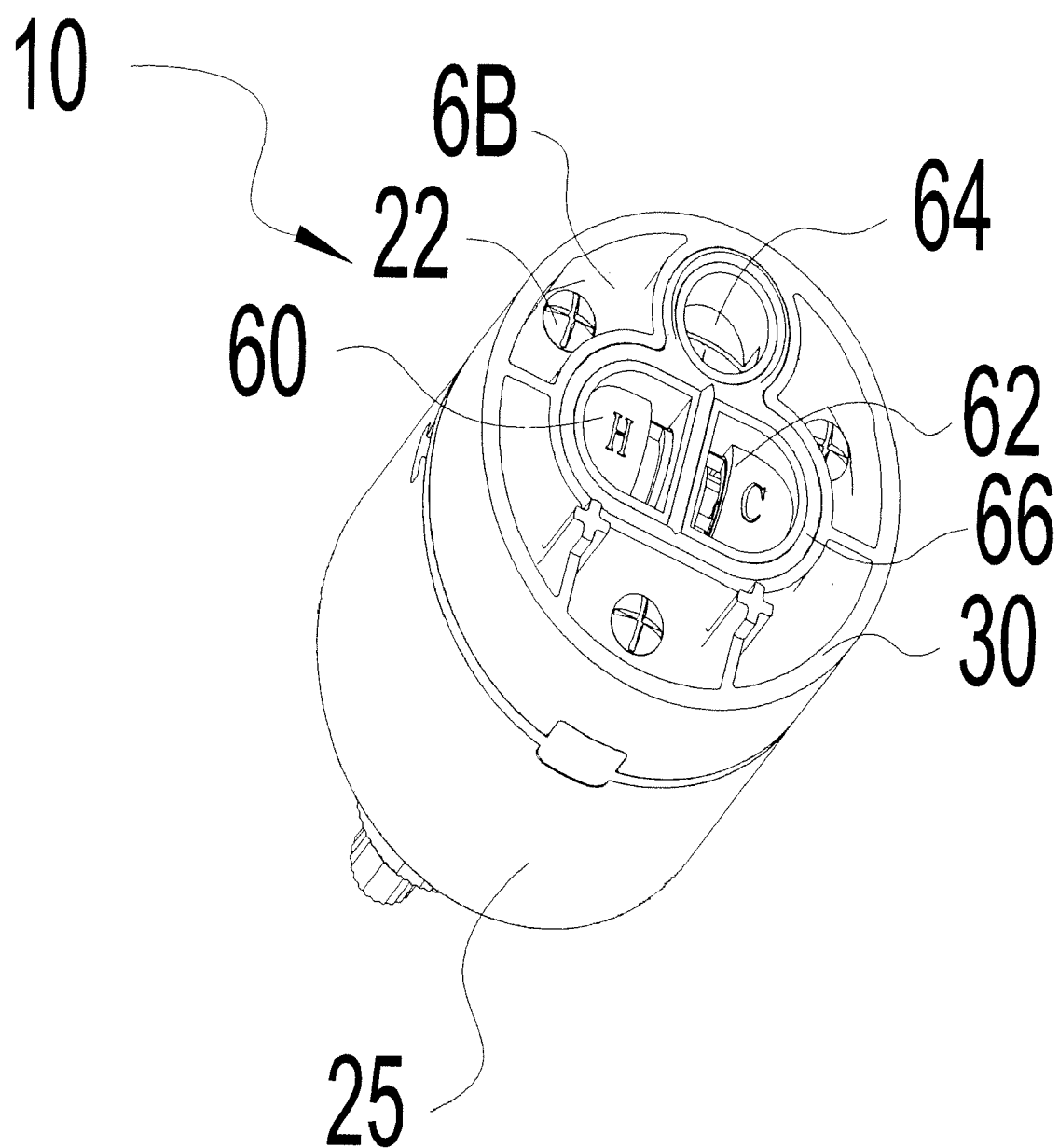
FIG. 2 is a perspective view of the mixing valve, showing a lower end portion of the mixing valve.
Figure 4:
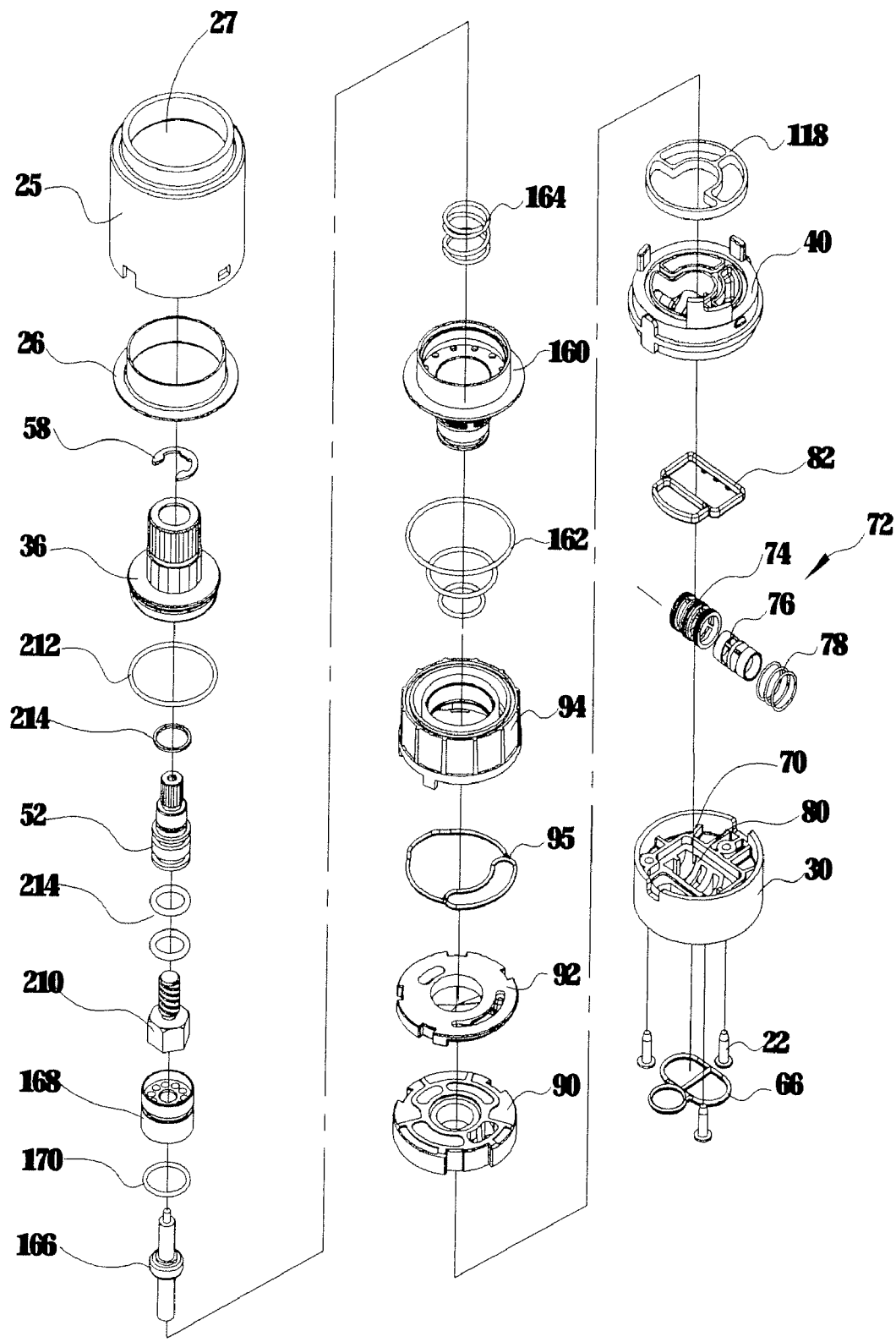
FIG. 4 is an exploded view of the mixing valve, showing the various components of the mixing valve.

A lower end view of the sub-base 30 is shown in FIG. 2. The sub-base 30 includes a hot water inlet 60, a cold water inlet 62, and a mixed water outlet 64. When the mixing valve 10 is installed, a hot water supply line is coupled to the hot water inlet 60, a cold water supply line is coupled to the cold water inlet 62, and a discharge line is coupled to the water outlet 64. An elastomeric gasket 66 resides within a channel along the periphery of the hot and cold inlets 60, 62 and the mixed water outlet 64. Due to the arrangement of the inlets 60, 62 and the mixed outlet 64, the gasket 66 has a three-lobed configuration. The sub-base 30 includes a number of recesses 68, wherein at least one recess 68 includes the elongated fastener 22 that secures the sub-base 30 to the base 40. Referring to FIG. 4, the upper portion of the sub-base 30 includes a first cavity 70 that receives an inlet pressure balancing assembly 72, preferably a lower half of the balancing assembly 72. The inlet pressure balancing assembly 72 is oriented perpendicular to a longitudinal axis A-A of the mixing valve 10, which extends through the spindle assembly 38. The inlet pressure balancing assembly 72 includes a piston 74, a shuttle 76 that slidingly resides within the piston 74, and O-rings 78. Preferably, the cavity 70 includes at least one curvilinear support 80 that cradles the piston 74 when the inlet pressure balancing assembly 72 is installed within the sub-base 40. As shown in FIG. 2, the hot and cold water inlets 60, 62 flank the curvilinear support 80. An upper elastomeric gasket 82 resides within a channel surrounding the cavity 70 and the water outlet 64.

Figure 3:
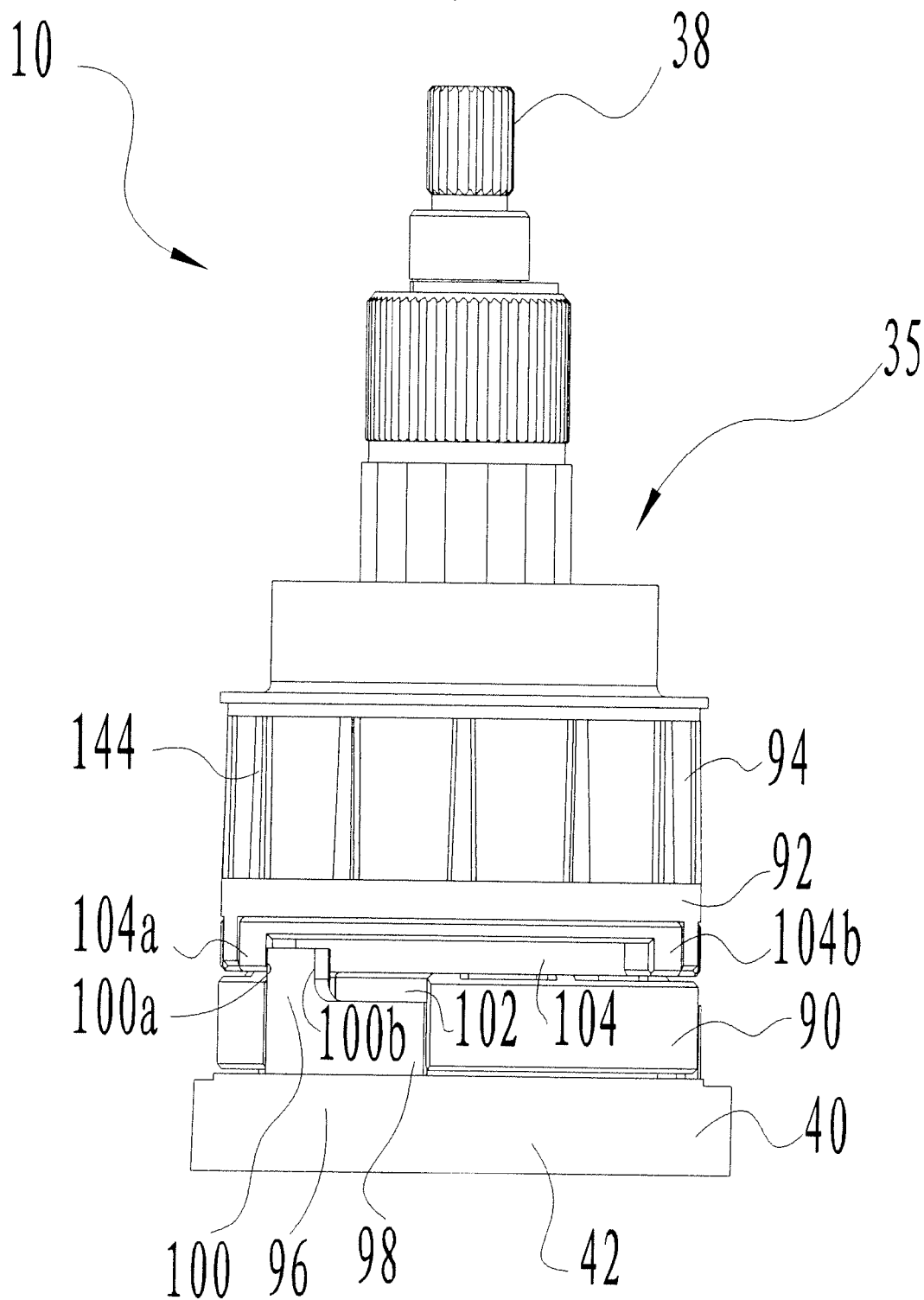
FIG. 3 is a side view of the mixing valve, with the exterior cover and sub-base removed.

The cover 25 has been removed from the mixing valve 10 in FIG. 3 to reveal the interaction of the internal components. A stationary or lower disk 90 is positioned above the base 40, and a rotatable or upper disk 92 is positioned above the stationary disk 90. As explained below, actuation of the spindle assembly 38 causes the upper disk 92 to rotate with respect to the lower disk 90. A cap 94 is positioned between the upper disk 92 and the flange 56 of the cartridge assembly 35. Referring to FIG. 3, the base 40 includes a sidewall 42 with an upwardly extending engaging member 96 for the stationary and rotatable disks 90, 92. The engaging member 96 comprises a pedestal 98 that extends into a notch 102 in the stationary disk 90 and a finger 100 that extends from the pedestal 98 into a channel 104 in the rotatable disk 92. Unlike actuators in conventional mixing valves, the pedestal 98 and finger 100 are located at the sidewall 42 of the base 40, not inward of the sidewall 42. In a preferred embodiment, the pedestal 98 and finger 100 provide the engaging member 96 with a staggered configuration which serves to limit relative rotation between the base 40 and the stationary disk 90. Preferably, the width of the pedestal 98 exceeds the width of the finger 100. During operation of the mixing valve 10, a first edge 100a of the finger 100 engages a first stop 104a of the disk channel 104 (see FIG. 3), and a second edge 100*b* of the finger 100 engages a second stop 104*b* of the disk channel 104.

Figure 5A:
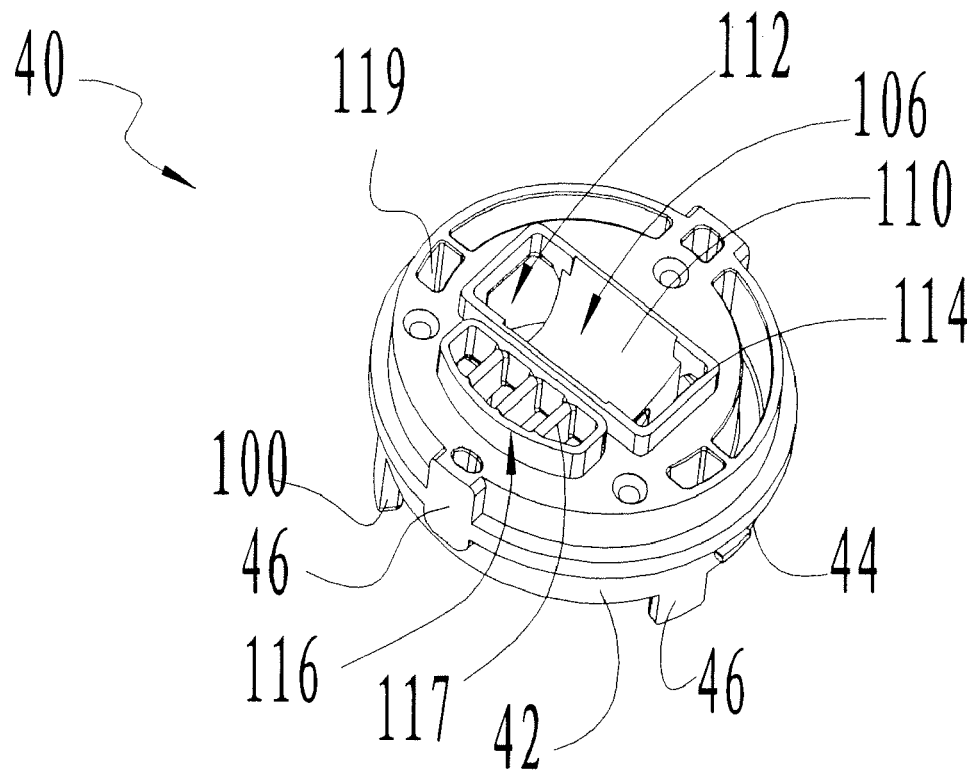
FIG. 5a is a perspective view of a base component of the mixing valve.

FIG. 5*a* shows the lower portion of the base 40, which includes a second cavity 106 that receives an upper half of the pressure balancing assembly 72. The first cavity 70 of the sub-base 30 and the second cavity 106 collectively define a receiver for the pressure balancing assembly 72. Thus, the pressure balancing assembly 72 is cradled by structures of both the base 40 and the sub-base 40. Preferably, the second cavity 106 includes at least one curvilinear support 110 that cradles the piston 74 when the inlet pressure balancing assembly 72 is installed within the sub-base 40. As shown in FIG. 5*a*, the base 40 includes hot and cold water inlets 112, 114 that reside within the periphery of the second cavity 106 and flank the curvilinear support 110. The base 40 includes a mixed water outlet 116 with at least one vane 117. In the assembled position P1 of FIGS. 1 and 2, the mixed water outlet 116 of the base 40 is aligned with the mixed water outlet 64 of the sub-base 40. The upper portion of the base 40 includes an elastomeric gasket 118 (see FIG. 4) that surrounds the hot and cold water inlets 112, 114 and the mixed water outlet 116. While the finger 100 and projection 46 are both shown in FIG. 5, the finger 100 differs in that it extends past the lower stationary disk 90 and into the channel 104 of the upper rotatable disk 92. The pedestal 98 has a lesser height wherein it only engages the lower stationary disk 90. The lower portion of the base 40 further includes openings 119 that receive the elongated fasteners 22 that couple the base 40 and the sub-base 40.

Figure 6A:
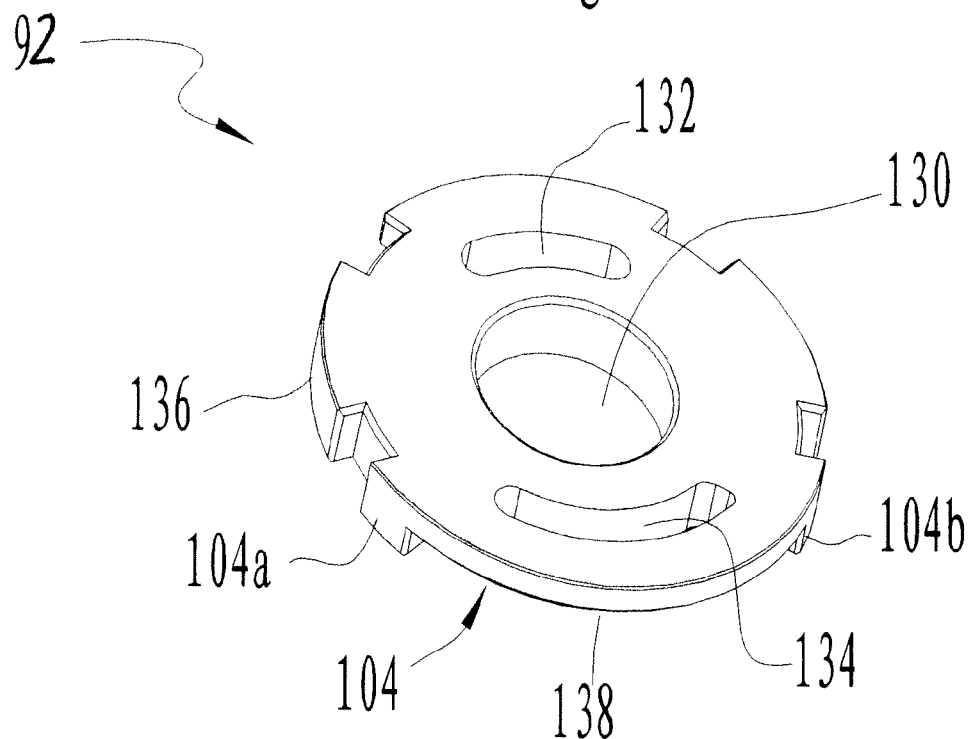
FIG. 6a is a perspective view of a rotatable disk component of the mixing valve.
Figure 6B:
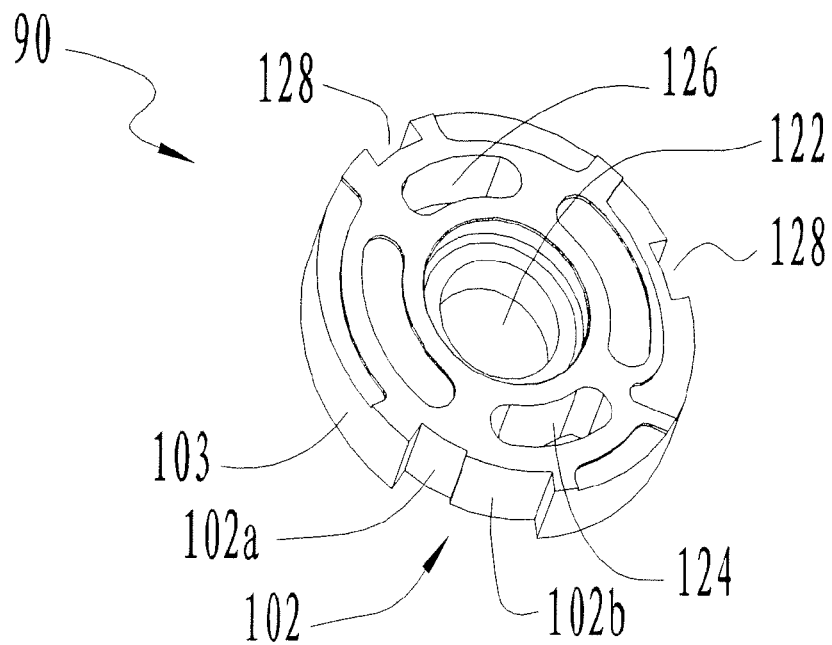
FIG. 6b is a perspective view of a stationary disk component of the mixing valve.

The stationary or lower disk 90 and the rotatable or upper disk 92 comprise a disk assembly 120 and are shown in FIGS. 3, 4 and 6*a, b*. In the assembled position P1 of FIG. 3, the stationary disk 90 and the rotatable disk 92 are substantially parallel to each other. As mentioned above, the stationary disk 90 is positioned adjacent the base 40. The stationary disk 90 includes a central opening 122 that accommodates a lower extent of the cartridge assembly 35, including a collar 160 and temperature sensor. The central opening 122 is stepped with a flange 123 that provides the opening 122 with a notched configuration. The stationary disk 90 also includes a hot water inlet opening 124 and a cold water inlet opening 126 positioned radially outward of the central opening 122. Preferably, the hot and cold water inlets 124, 126 are configured as slots and have a chamfered internal wall arrangement. As shown in FIG. 6*b*, the stationary disk 90 also has the peripheral notch 102 in the sidewall 103, and at least one recess 128 circumferentially spaced from the notch 102. The notch 102 receives the engaging member 96, namely the pedestal 98 and the finger 100, extending upward from the base 40, while the recess 128 receives the projection 46 extending from the base 40. In a preferred embodiment, the notch 102 has a staggered configuration wherein a first segment 102*a* is recessed from a second segment 102*b*. Referring to FIG. 3, the first segment 102*a* receives the finger 100 and the second segment 102*b* receives the pedestal 98 of the engaging member 96.

The rotatable disk 92 is stacked upon the stationary disk 90 in the assembled position P1. Referring to FIG. 6*a*, the rotatable disk 92 includes a central opening 130 that also accommodates a lower extent of the cartridge assembly 35. A hot water inlet opening 132 and a cold water inlet 134 are positioned radially outward of the central opening 136. Preferably, an upper edge of the cold water inlet 134 is larger than the lower edge, where the latter has dimensions that correspond to the hot water inlet 132. Thus, the periphery of the upper edge of the cold water inlet 134 exceeds the periphery of the lower edge of the inlet 134. The channel 104 is formed in the peripheral sidewall 136 of the rotatable disk 92, and a hood 138 defines the upper boundary of the channel 104. The channel 104 is bounded by a first stop 104*a* that contacts the first edge 100*a* of the finger 100 during operation of the mixing valve 10, and a second stop 104*b* that contacts the second edge 100*b* of the finger 100 during operation. Unlike disks found in conventional mixing valves, the channel 104 and the notch 102 are located at the peripheral sidewall 136 of the disk 92, not radially inward of the periphery. In a preferred embodiment, the stationary disk 90 and the rotatable disk 92 are formed from the same material composition, such as a ceramic material.

Figure 7A:
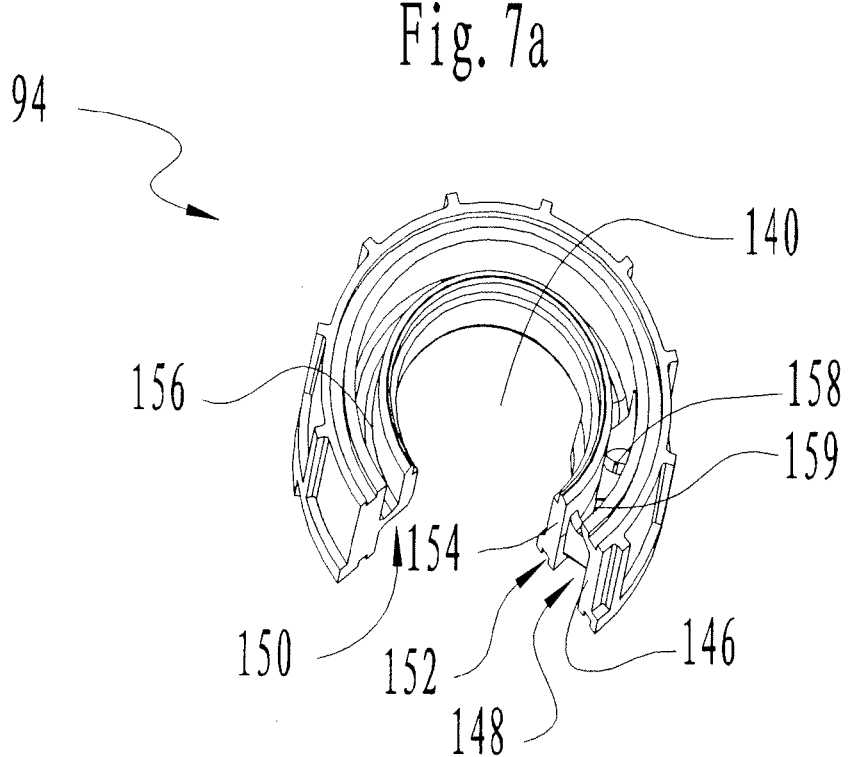
FIG. 7a is a partial cross-section view of a cap component of the mixing valve.
Figure 7B:
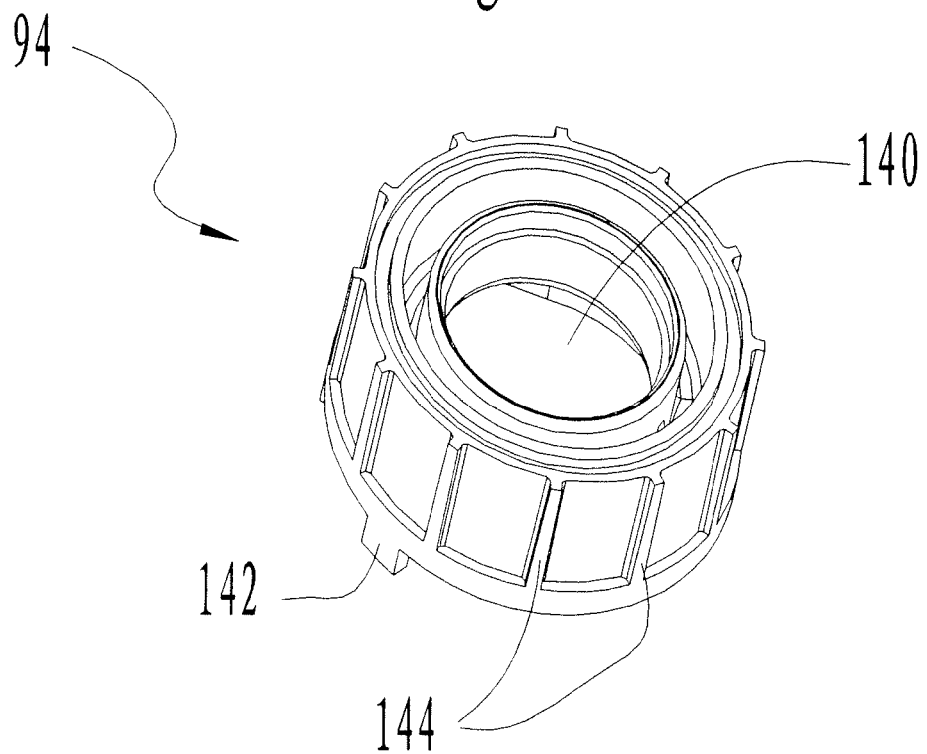
FIG. 7b is a perspective view of the cap component of the mixing valve.

The cap 94 that couples with the rotatable disk 92 is shown in FIGS. 3, 4 and 7*a, b*. The cap 94 has a generally annular body with a central opening 140 that receives a portion of the cartridge assembly 35. A lower edge of the cap 94 has at least one depending tab 142 that is received by the recess 128 in the rotatable disk 92 to operably couple the cap 94 and rotatable disk 92. In the embodiment of FIGS. 7*a* and *b*, the cap 94 has longitudinal ribs 144 which increase its structural rigidity. The cap 94 has an outer wall 146 and a cavity arrangement 148 residing therein. The cavity arrangement 148 includes a hot water cavity 150 and a cold water cavity 152. The hot water cavity 150 extends between the outer wall 146 and the cartridge assembly 35. An inner wall 154 extends from a portion of the outer wall 146 to define the cold water cavity 152, which provides a cold water inlet between the rotatable disk 92 and the cartridge assembly 35. While the hot water cavity 150 is bounded by an intermediate wall 156 of the cap 94, the cold water cavity 152 extends vertically through the cap 94 and has at least vane 158 that partitions the cavity 152 and defines compartments 159 of the cavity 152. Preferably, the arc length of the hot water cavity 150 exceeds the arc length of the cold water cavity 152. Most preferably, the arc length of the hot water cavity 150 exceeds the arc length of the cold water cavity 152 by a ratio of 2:1. A sealing element 95, such as a gasket, is positioned along the lower periphery of the cap 94 and the cavities 150, 152.

Figure 5B:
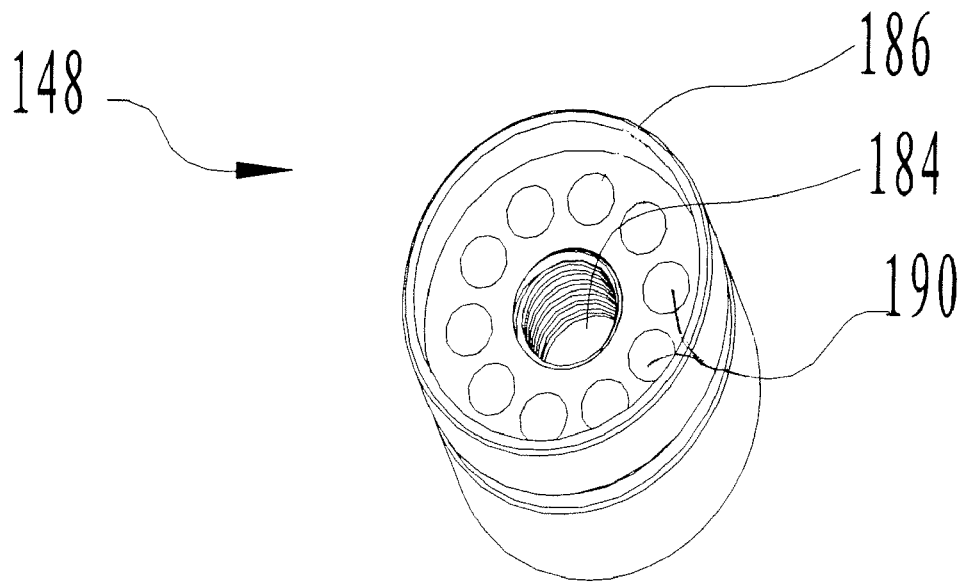
FIG. 5b is a perspective view of a slide bolt component of the mixing valve.
Figure 5C:
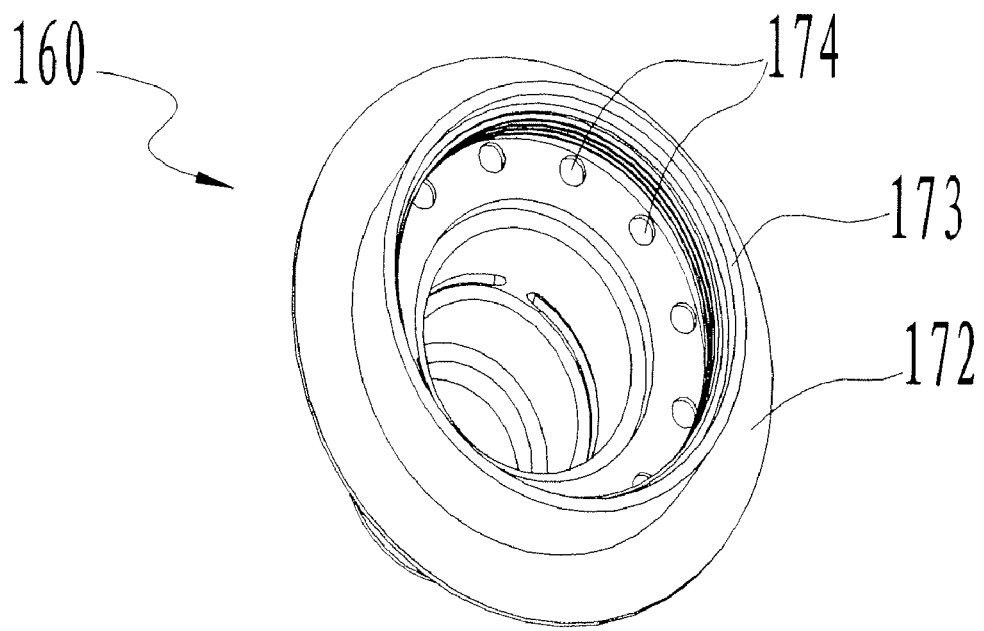
FIG. 5c is a perspective view of a skirt component of the mixing valve.
Figure 5D:
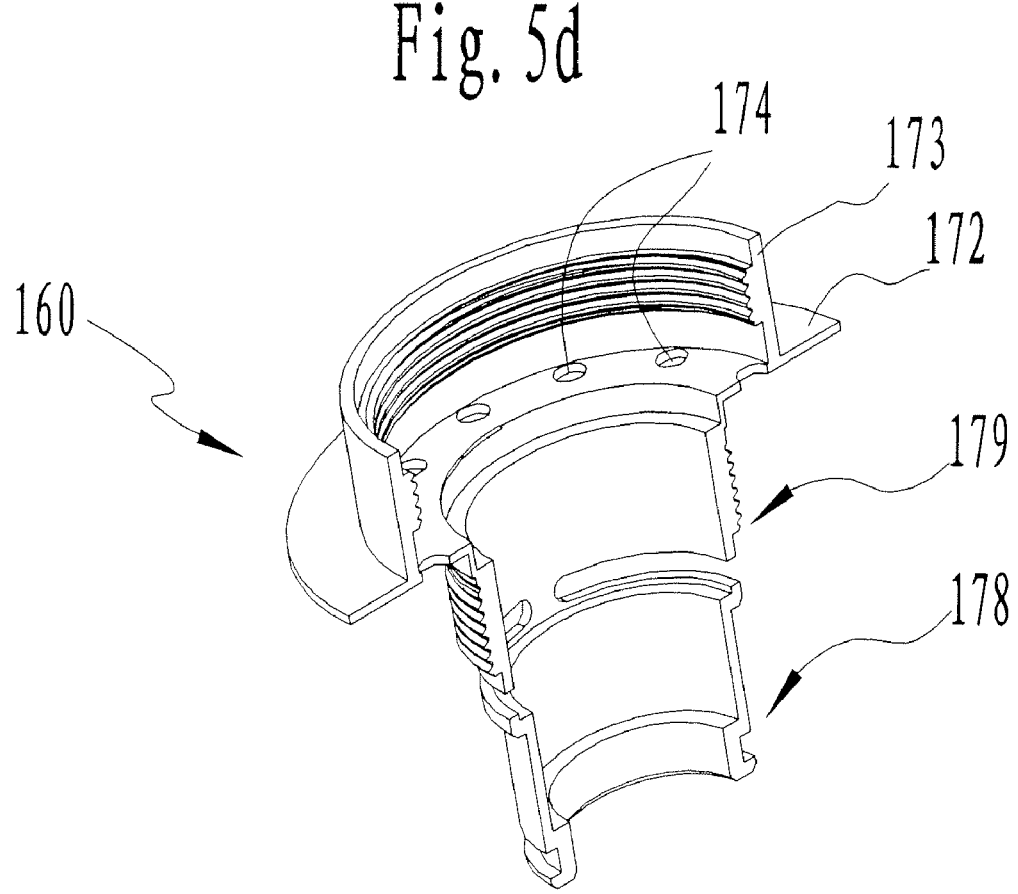
FIG. 5d is a longitudinal cross-section of the skirt component of FIG. 5c.

The cartridge assembly 35 is shown in FIGS. 4 and 8-10 and represents a collection of components. Specifically, the cartridge assembly 35 comprises a collar 160, O-rings 162 positioned between the cap 94 and the collar 160, a spring 164, a temperature sensor 166, a slide bolt 168, and at least one O-ring 170 positioned between the temperature sensor 166 and the slide bolt 168. Referring to FIGS. 5*c* and 5*d*, the collar 160 includes a flange 172 with at least one aperture 174 located radially inward of an upwardly extending ring 173. In one embodiment, the collar 160 includes multiple apertures 174 that are spaced along the innter periphery of the ring 173. The aperture 174 forms a cold water inlet that is alignable with the cold water cavity 152, wherein the cold water cavity 152 is alignable with the cold water inlets 126, 134 of the rotatable and stationary disks 90, 92. The collar 160 also includes a skirt 178 that depends from a main body portion 179 of the collar 160. Preferably, the main body 179 and the skirt 178 are tubular to accommodate slide bolt 168 and the temperature sensor 166. An upper portion of the skirt 178 has at least one aperture 180 that forms a hot water inlet that is alignable with the hot water cavity 150, wherein the hot water cavity 150 is alignable with the hot water inlets 124, 132 of the rotatable and stationary disks 90, 92. In on embodiment, the collar 160 includes a plurality of apertures 180 configured as slots along the circumference of the skirt 178.

The spring 164 is positioned within the inner wall of the collar 160, proximate the skirt 178, and the slide bolt 168. The spring 164 is supported by a ledge 178*a*, 168*a* formed in each of the skirt 178 and the slide bolt 168, and exerts a biasing force thereupon when compressed. The slide bolt 168 is slidingly positioned within the collar 160, preferably adjacent the main body portion 179 of the collar 160, and includes a central opening 184 that receives the temperature sensor 166. The slide bolt 168 has an upper circumferential lip 186 that resides within a void 188 between a flange 37 of the spindle regulator 36 and the collar 160. Radially inward of the lip 186, the slide bolt 168 has at least one aperture 190 that forms a cold water inlet that receives cold water flowing through the void 188 and the cold water inlet 176 of the flange 172 or collar 160. As explained in greater detail below, when the operator desires cold water from the mixing valve 10, cold water flows over the lip 186 and downward into the slide bolt 168 via the aperture 190 that forms the cold water inlet. In the embodiment of FIG. 5b, the slide bolt 168 has a plurality of apertures 190 arrayed within the circumferential lip 186.

A water mixing chamber 200 is a tubular region within the mixing valve 10, primarily residing within the collection of the slide bolt 168, the collar 160, namely the skirt 178 region of the collar 160, and the central openings 130, 122 of the rotatable disk 92 and the stationary disk 90. Also, the temperature sensor 166 is positioned within the mixing chamber 200. Described in a different manner, the mixing chamber 200 is an internal mixing region residing within an apertures of the cap 94, the upper rotatable disk 92 and the lower stationary disk 90. Due to the fact that hot and cold water flow paths $F_H$, $F_C$ lead into the slide bolt 168 and the skirt 178 through apertures 180, 190 therein, the slide bolt 168 and the skirt 178 define a significant portion of the outer boundary region of the mixing chamber 200. Since the aperture 180 in the skirt 178 that forms the hot water inlet 182 is located near a lower edge of the slide bolt 168, the majority of hot and cold water interaction in the mixing chamber 200 occurs below this aperture 180. As explained below, the mixing chamber 200 discharges a mixed water composition through the mixed water outlets 116, 64 in the base 40 and sub-base 30. The cartridge assembly 35 further includes a spindle assembly 38 that includes a strut 210, the elongated spindle 52, the spindle regulator 36, at least one bushing 212, a collection of O-rings 214 positioned among these components, and the retaining element 58. As explained below, vertical movement of the slide bolt 168 and the temperature sensor 166 result in similar movement by the strut 210 within the spindle regulator 36.

The temperature sensor 166 is coupled to and extends through the slide bolt 168. The sensor 166 is a temperature sensitive element that expands or contracts depending upon the temperature of the water composition in the mixing chamber 200. The temperature sensor 166 is adapted to dispense mixed water within a certain temperature range, so its expansion and contraction will vary with the temperature in the mixing chamber 200 to maintain the desired temperature balance. The rotation of the spindle 52 about the longitudinal axis A-A (see FIGS. 8-10) results in substantially vertical movement of the sensor 166, the slide bolt 168, and the strut 210. The movement of the sensor 166 and the slide bolt 168 correspond to vertical movement of the strut 210 within an internal cavity 52a of the spindle 52. In a preferred embodiment, a lower portion of the temperature sensor 166 extends past the lower edge of the skirt 178 and into the central opening 130 of the rotatable disk 92 and the stationary disk 90.

Figure 8:
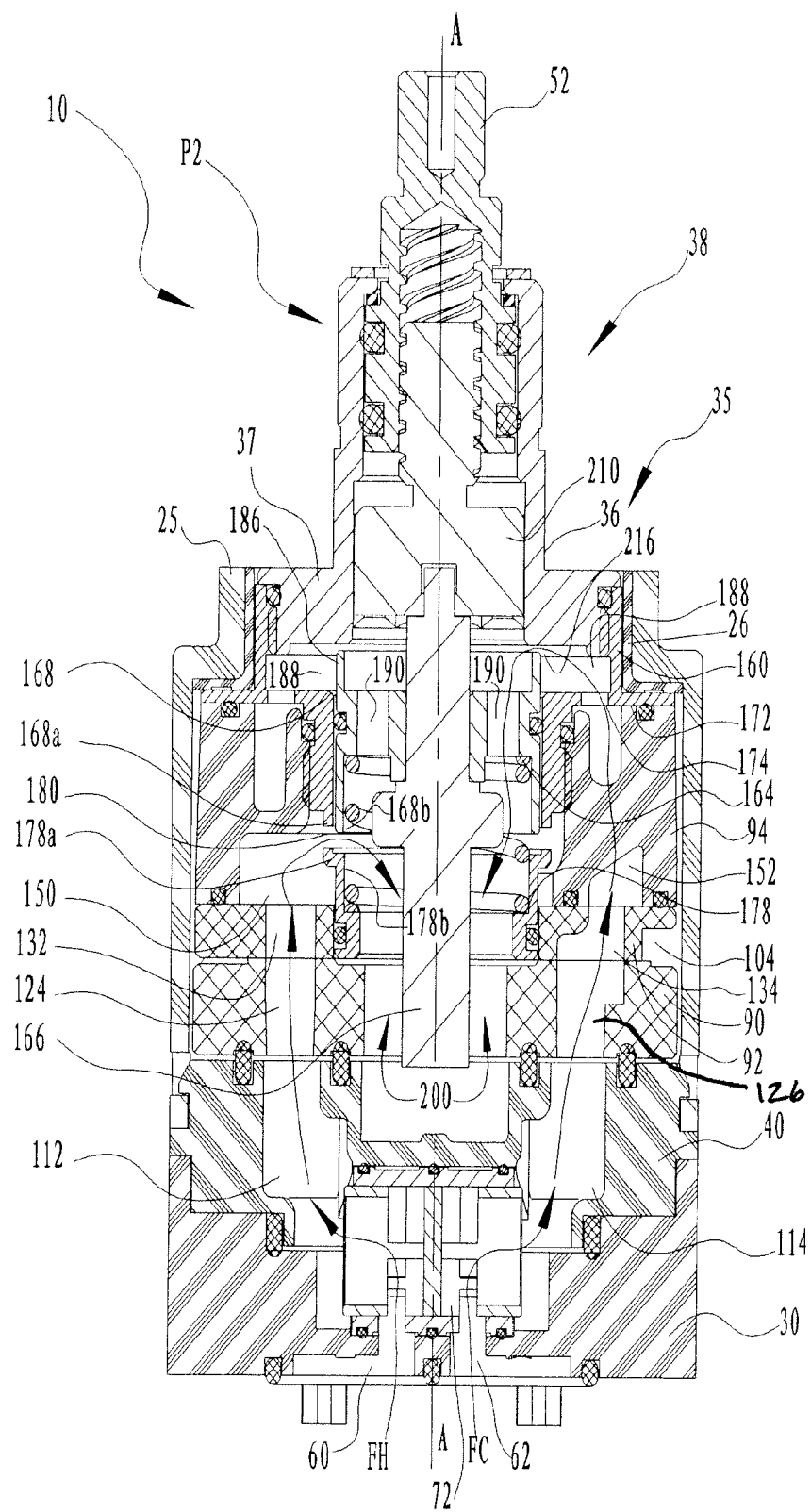
FIG. 8 is a longitudinal cross-section of the mixing valve, showing the mixing valve in a mixed water position.
Figure 8A:
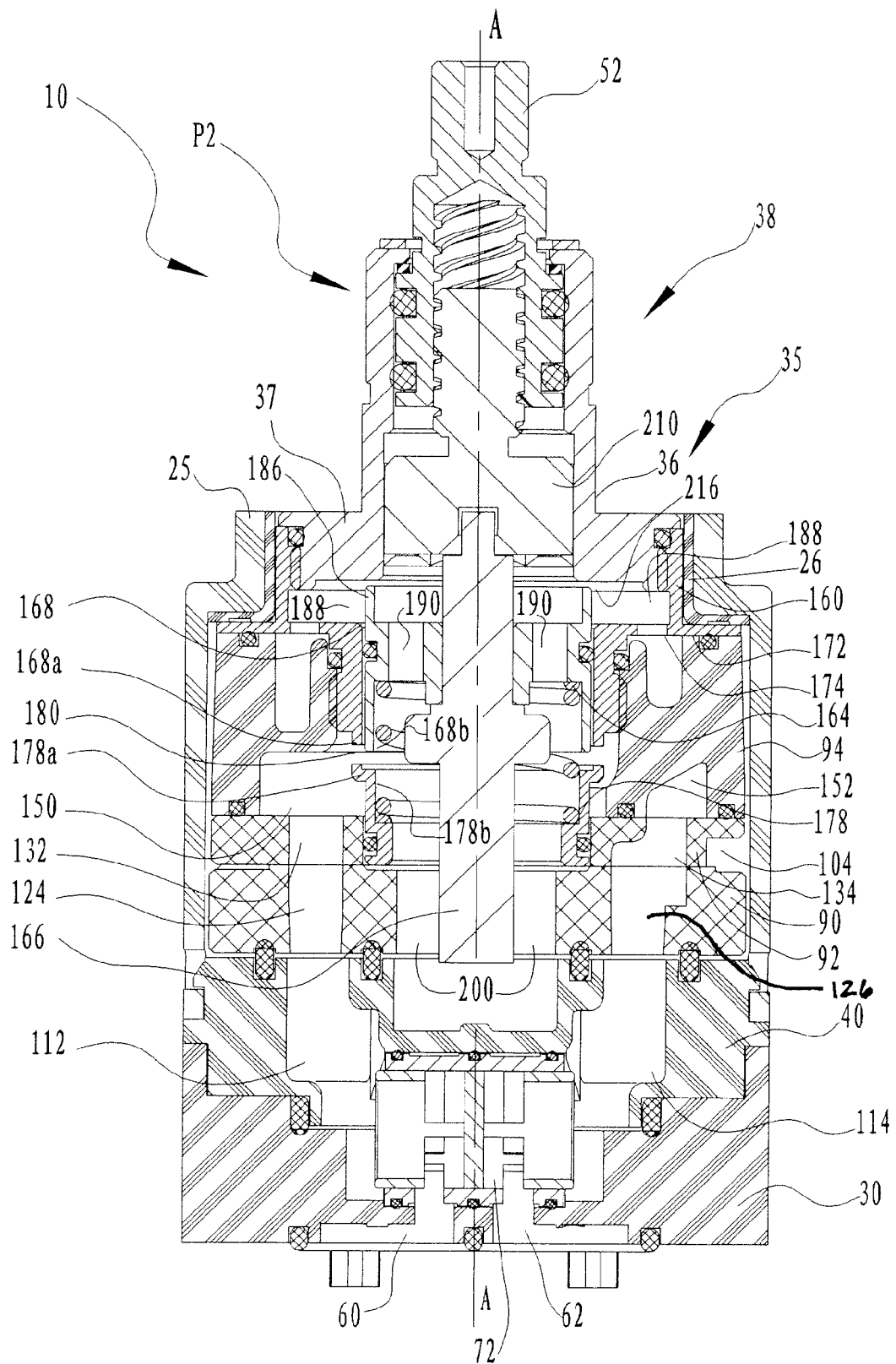
FIG. 8a is a longitudinal cross-section of the mixing valve, showing the mixing valve in a mixed water position similar of FIG. 8 but with the water flow arrows omitted.

FIG. 8 shows the mixing valve 10 in a combined hot and cold water position P2 where both hot and cold water are supplied into the mixing chamber 200 and a mixed water composition, presumably at an intermediate temperature, is discharged from the mixing valve 10. To arrive at the combined position P2, the operator actuates the mixing valve 10 by rotating the spindle regulator 36 such that the finger 100 of base 40 engages the first stop 104a of the rotatable disk 92. In this positional arrangement, the hot and cold water inlets in the sub-base 30, the base 40, and the disks 90, 92 are aligned to define water flow paths.

Referring to the left side of FIG. 8, the hot water flow path $F_H$ is shown with the arrows extending through the hot water inlet 60 of the sub-base 30 and past the pressure balancing assembly 72. The hot water flow path $F_H$ continues through the hot water inlet 112 of the base 40, the hot water inlet 124 of the stationary disk 90 and the hot water inlet 132 of the rotatable disk 92, all of which are aligned. Once the hot water enters the hot water cavity 150 of the cap 94, it flows through the aperture(s) 180 in the skirt 178 of the collar 160 and into the mixing chamber 200. Referring to the right side of FIG. 8, the cold water flow path Fc is shown with the arrows extending through the cold water inlet 62 of the sub-base 30 and past the pressure balancing assembly 72. The cold water flow path Fc continues through the cold water inlet 114 of the base 40, the cold water inlet 126 of the stationary disk 90 and the cold water inlet 134 of the rotatable disk 92, all of which are aligned. The cold water flow path Fc continues upward through the cold water cavity 152 of the cap 94, past the aperture(s) 174 in the flange 172 of the collar 160 and into the adjacent void 188. Because the slide bolt 168 is spaced a distance from the lower edge of the spindle regulator flange 37, a clearance 216 is created which enables the cold water flow path Fc to proceed over the lip 186 of the slide bolt 168 and then down through the aperture 190 of the slide bolt 168. The cold water flow path Fc continues downward past the spring 164 and the lower edge of the skirt 178 and into the mixing chamber 200. In the mixing chamber 200, the hot water flow path $F_H$ converges and mixes with the cold water flow path Fc to form a mixed water composition that flows through the central opening 122, 130 in both the rotatable and stationary disk 90, 92 and then is discharged from the mixing valve 10 through the mixed water outlets 64, 116 of the base 40 and sub-base 40.

In the event that the temperature of one of the water supplies unexpectedly changes, the interaction between the temperature sensor 166, the slide bolt 168 and the strut 210 enable the mixing valve 10 to automatically maintain a near constant temperature of mixed water to be discharged. For example, if the temperature of the hot water supply suddenly increases beyond the desired temperature set by the operator, then the temperature of the mixed water in the mixing chamber 200 will increase as well. This temperature increase causes the temperature sensor 166 to expand in a downward direction, which also draws the slide bolt 168 downward. Upward movement of the sensor 166 and the slide bolt 168 is precluded by the strut 210, which resists movement due to its internal engagement with the spindle 52. Due to the downward movement of the sensor 166 and the slide bolt 168, a lower edge 168a of the slide bolt 168 obstructs the aperture 180 thereby reducing the quantity of water flowing along the hot water path $F_H$ into the mixing chamber 200. The downward movement also increases the clearance 216 between the spindle regulator flange 37 and the upper lip 186 whereby the quantity of water flowing along the cold water path $F_C$ into the mixing chamber 200 is increased. The opposite movement occurs in the situation where the temperature of the cold water supply suddenly decreases beyond the desired temperature set by the operator and the temperature of the mixed water in the mixing chamber 200 decreases. Accordingly, the expansion of the temperature sensor 166 results in movement of the slide bolt 168 which enables the mixing valve 10 to automatically maintain a near constant temperature of mixed water to be discharged.

Figure 9:
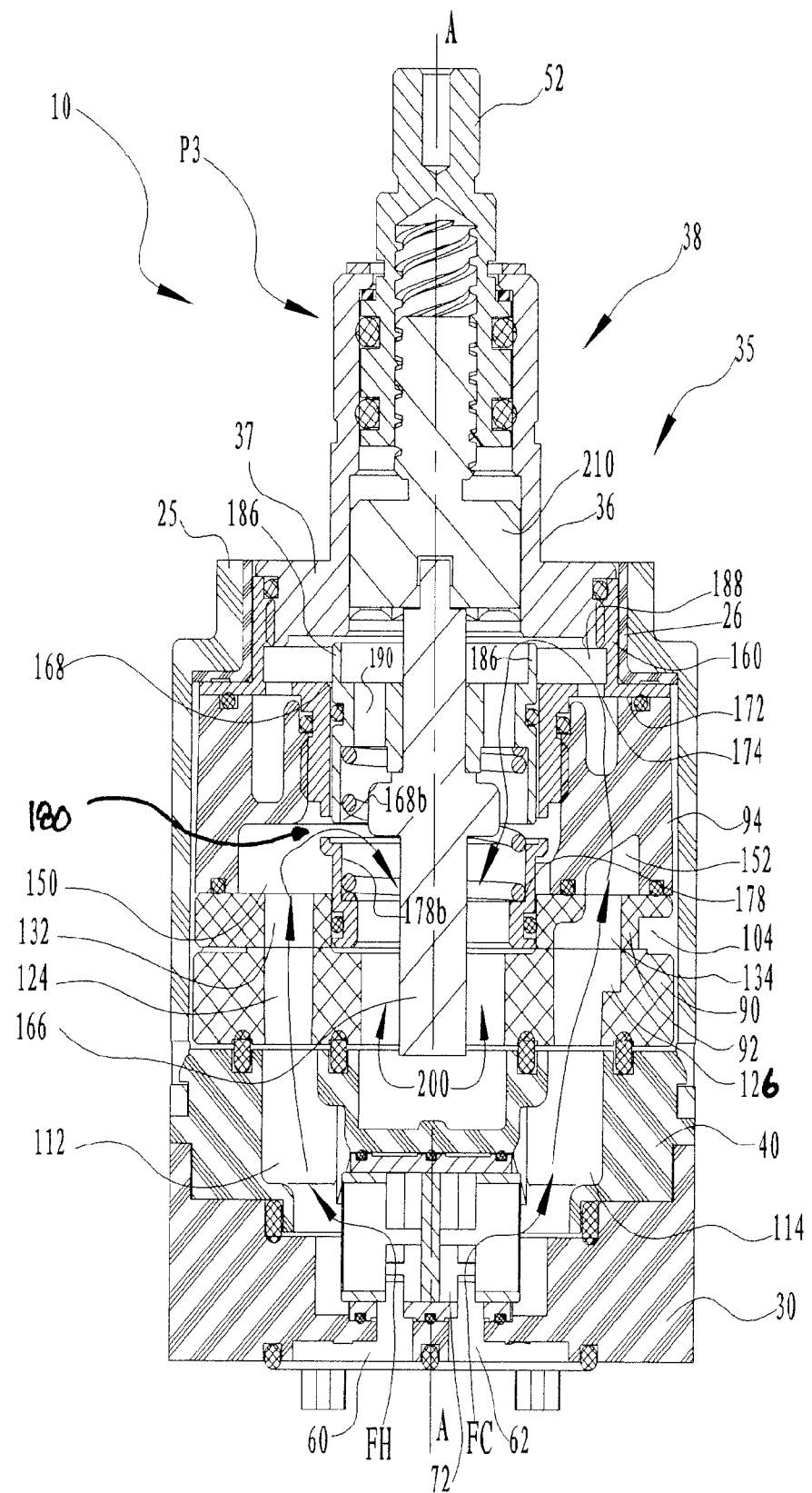
FIG. 9 is a longitudinal cross-section of the mixing valve, showing the mixing valve in hot water only position; and, FIG. 9a is a is a longitudinal cross-section of the mixing valve, showing the mixing valve in the hot water position similar of FIG. 9 but with the water flow arrows omitted.
Figure 9A:
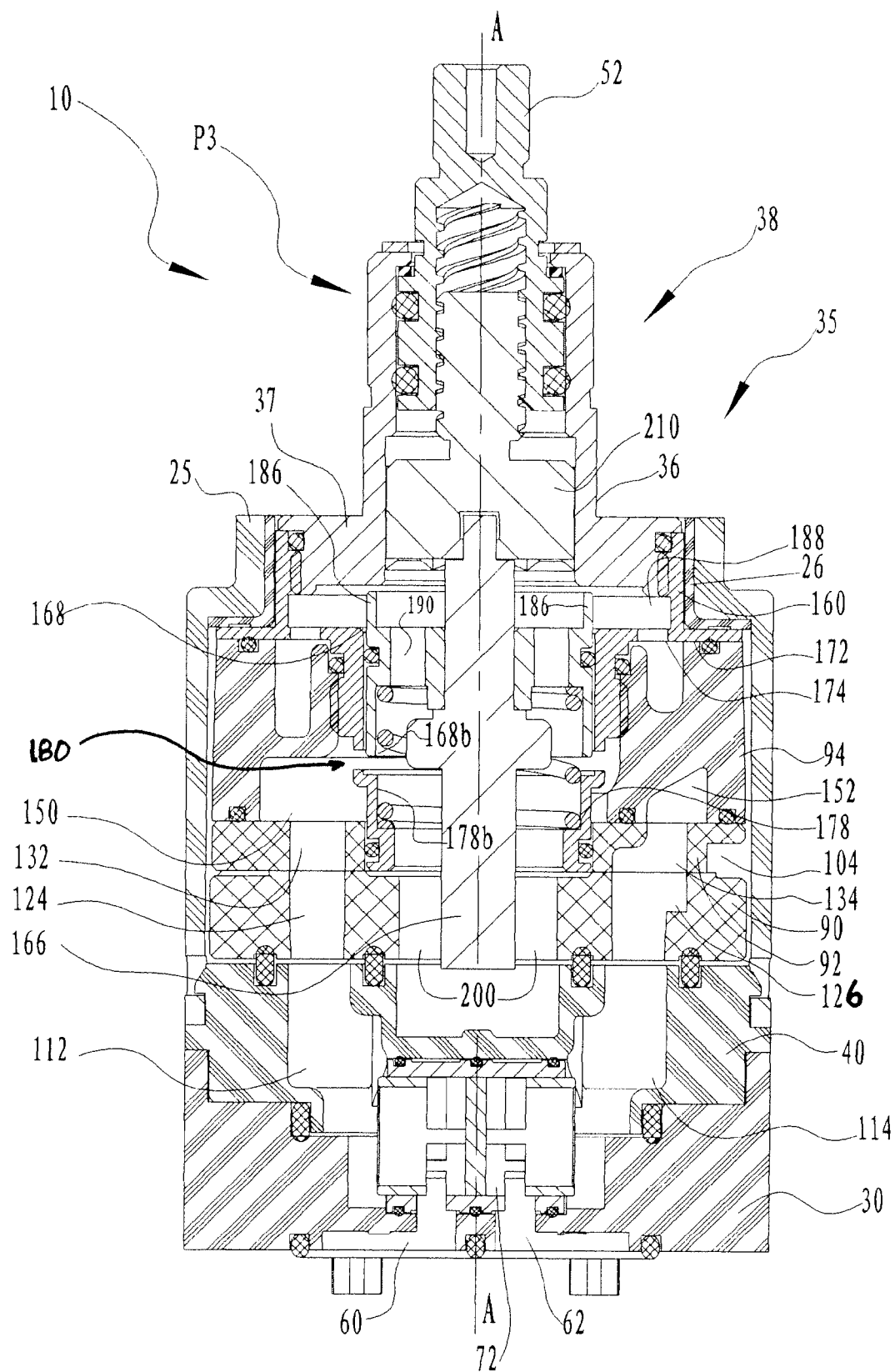

FIG. 9 depicts the mixing valve 10 in a hot water only position P3 where hot water is supplied to the mixing chamber 200, but cold water is precluded from entering the mixing chamber 200 and only hot water is discharged from the mixing valve 10. To arrive at the hot water position P3, the operator actuates the mixing valve 10 by rotating the spindle 52 to increase the temperature of the mixed water in the mixing chamber 200. Rotation of the spindle 52 causes the strut 210 to move upward along the longitudinal axis A-A, which also draws the temperature sensor 166 and the slide bolt 168 upward. As explained below, the movement of these components affects the hot water flow path $F_H$ through the aperture(s) 180 and the cold water flow path $F_C$ past the clearance 216. Furthermore, the spindle regulator 36 is rotated such that the finger 100 is positioned between the first and second stops 104a, b and at an intermediate portion of the channel 104. In this positional arrangement, the hot water inlets 60, 112 and cold water inlets 62, 114 in the sub-base 40 and the base 40, and the hot water inlets 124, 132 and cold water inlets 126, 134 in the disks 90, 92 are partially aligned to define water flow paths.

Referring to the left side of FIG. 9, the hot water flow path $F_H$ extends through the hot water inlet 60 of the sub-base 30 and past the pressure balancing assembly 72. The hot water flow path $F_H$ continues through the hot water inlet 112 of the base 40, the hot water inlet 124 of the stationary disk 90 and the hot water inlet 132 of the rotatable disk 92, all of which are aligned. Once the hot water enters the hot water cavity 150 of the cap 94, it flows through the aperture(s) 180 in the skirt 178 of the collar 160 and into the mixing chamber 200. Thus, the hot water flow path $F_H$ in the hot water position P3 is generally consistent with that found in the mixed water position P2 (see FIG. 8). After the hot water in flow path $F_H$ enters the mixing chamber 200, it flows through the central opening 122, 130 in the rotatable and stationary disks 90, 92 and then is discharged from the mixing valve 10 through the mixed water outlets 64, 116 of the base 40 and sub-base 40. When the spindle 52 is rotated and the mixing valve 10 moves from the mixed flow position P2 to the hot water flow position P3, there is an increase in the quantity of water in the hot water flow path $F_H$ through the aperture 180 and into the mixing chamber 200.

Referring to the right side of FIG. 9, the cold water flow path Fc is shown with the arrows extending through the cold water inlet 62 of the sub-base 30 and past the pressure balancing assembly 72. The cold water flow path Fc continues through the cold water inlet 114 of the base 40, the cold water inlet 126 of the stationary disk 90 and the cold water inlet 134 of the rotatable disk 92, all of which are aligned. The cold water flow path Fc continues upward through the cold water cavity 152 of the cap 94, past the aperture 174 in the flange 172 of the collar 160 and into the adjacent void 188. However, the cold water flow path Fc is halted in this area because the slide bolt 168 engages the lower surface 52a of the spindle regulator 36. Specifically, the slide bolt 168 has moved upward wherein the lip 186 of the slide bolt 168 contacts the lower surface 52a of the spindle regulator 36 thereby eliminating the clearance 216 found in FIG. 8. This movement of the slide bolt 168 results from the expansion of the temperature sensor 166 as it senses the temperature of the water in the mixing chamber 200. Preferably, the slide bolt 168 moves along the longitudinal axis A-A of the mixing valve 10. Consequently, the cold water flow path Fc is halted and cold water cannot enter the mixing chamber 200 for subsequent discharge from the mixing valve 10.

Figure 10:
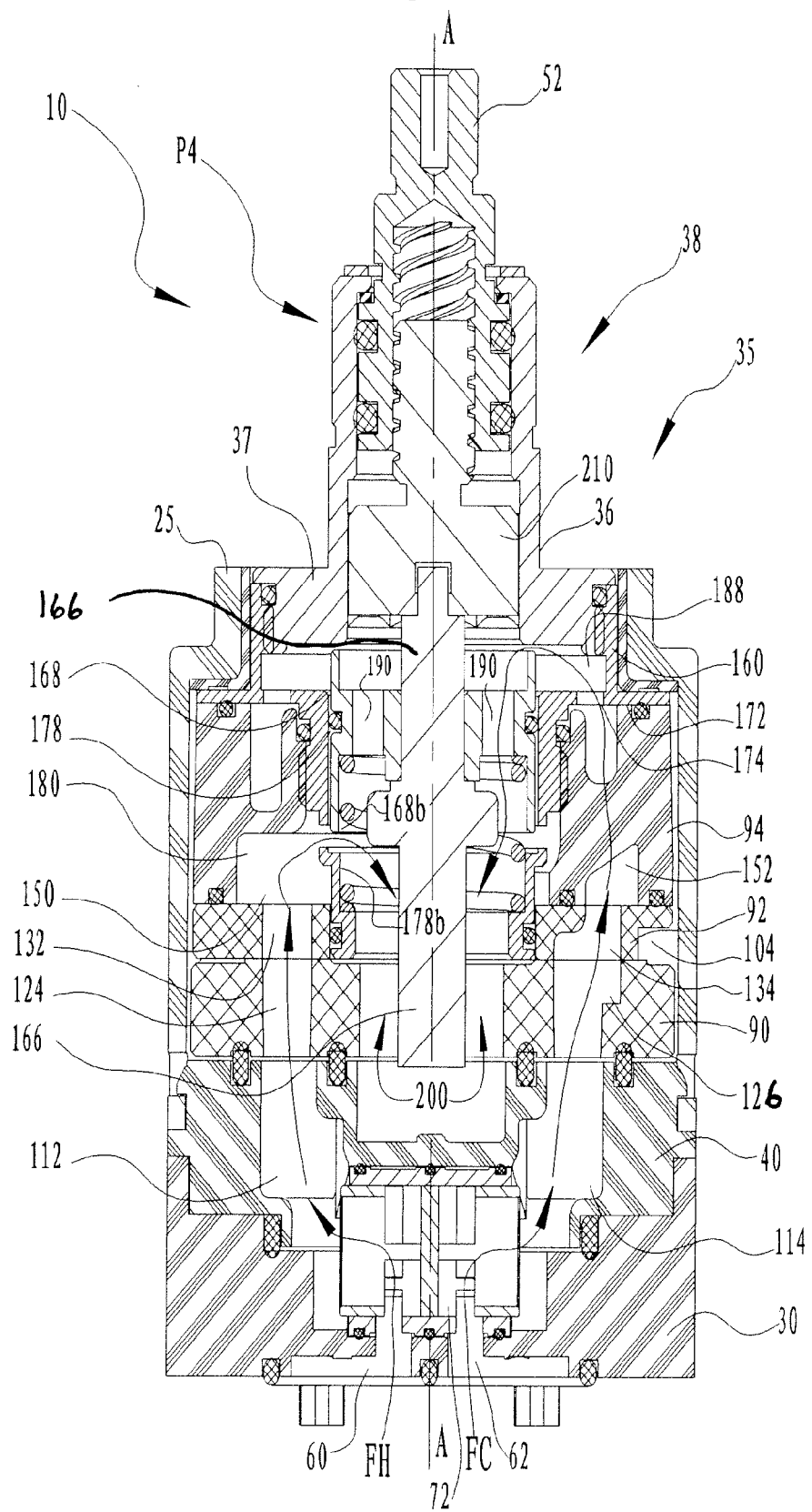
FIG. 10 is a longitudinal cross-section of the mixing valve, showing the mixing valve in a cold water only position.
Figure 10A:
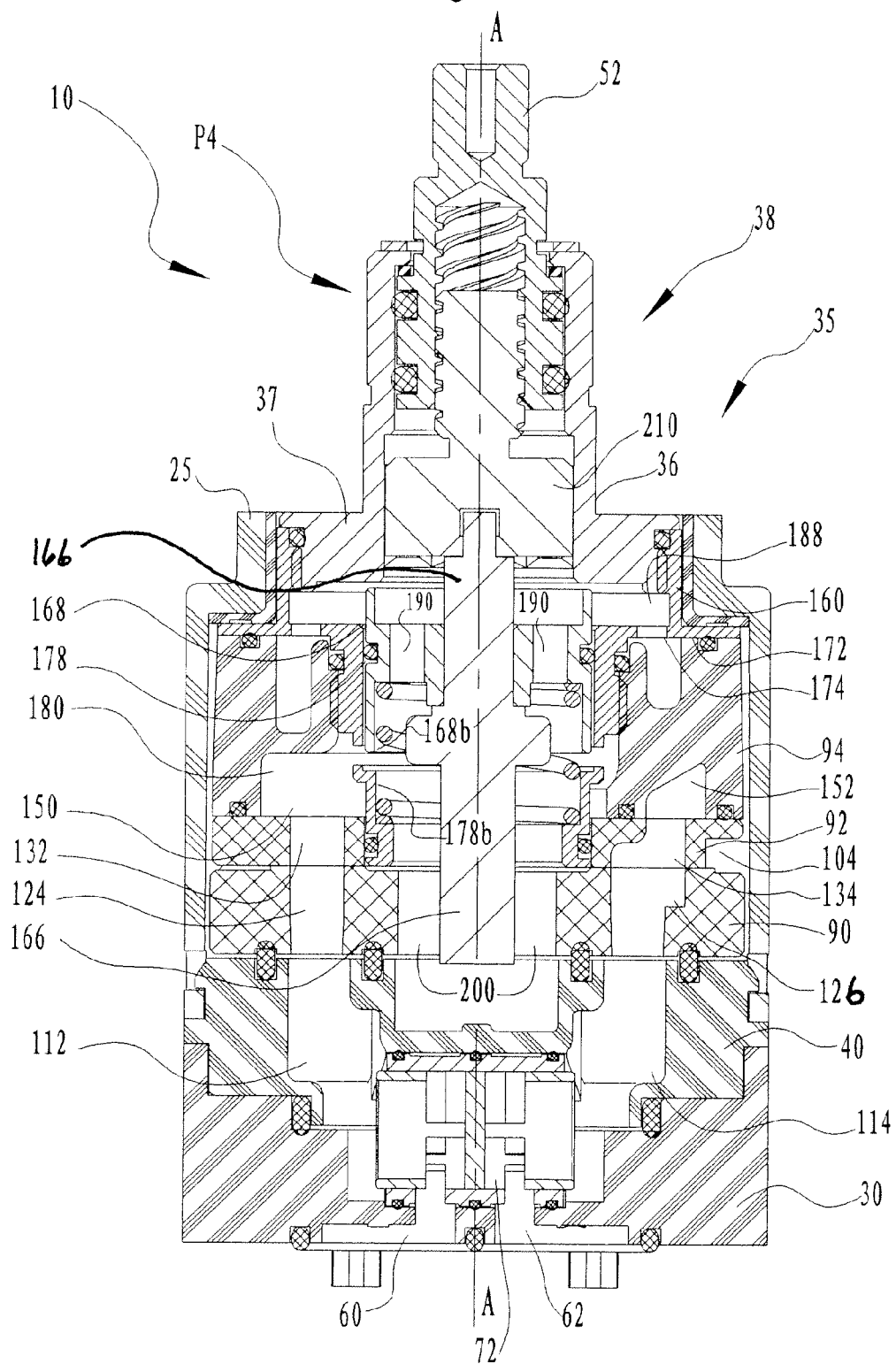
FIG. 10a is a longitudinal cross-section of the mixing valve, showing the mixing valve in a cold water position similar of FIG. 10 but with the water flow arrows omitted.

FIG. 10 depicts the mixing valve 10 in a cold water only position P4 where cold water is supplied to the mixing chamber 200, but hot water is precluded from entering the mixing chamber 200 and only cold water is discharged from the mixing valve 10. To arrive at the cold water position P4, the operator actuates the mixing valve 10 by rotating the spindle 52 to decrease the temperature of the mixed water in the mixing chamber 200. Rotation of the spindle 52 causes the strut 210 to move downward along the longitudinal axis A-A, which also draws the temperature sensor 166 and the slide bolt 168 downward. As explained below, the movement of these components affects the hot water flow path $F_H$ through the aperture(s) 180 and the cold water flow path $F_C$ past the clearance 216. Furthermore, the spindle regulator 36 is rotated such that the finger 100 is positioned between the first and second stops 104a, b and at an intermediate portion of the channel 104. In this positional arrangement, the hot water inlets 60, 112, 124, 132 and the cold water inlets 62, 114, 126, 134 in the sub-base 40, the base 40, and the disks 90, 92 are partially aligned to define water flow paths.

Referring to the left side of FIG. 10, the hot water flow path $F_H$ extends through the hot water inlet 60 of the sub-base 30 and past the pressure balancing assembly 72. The hot water flow path $F_H$ continues through the hot water inlet 112 of the base 40, the hot water inlet 124 of the stationary disk 90 and the hot water inlet 132 of the rotatable disk 92, all of which are aligned. Once the hot water enters the hot water cavity 150 of the cap 94, the hot water flow path $F_H$ is halted in this area because the slide bolt 168 overlaps the aperture(s) 180 in the skirt 178 to prevent additional flow. Specifically, the slide bolt 168 moves downward wherein a lower edge 168b of the slide bolt 168 engages an interior ledge 178b of the skirt 178 thereby obstructing the aperture(s) 180. Accordingly, the hot water flow path $F_H$ is halted and it cannot enter the mixing chamber 200 for subsequent discharge from the mixing valve 10.

Referring to the right side of FIG. 10, the cold water flow path Fc is shown with the arrows extending through the cold water inlet 62 of the sub-base 30 and past the pressure balancing assembly 72. The cold water flow path Fc continues through the cold water inlet 114 of the base 40, the cold water inlet 126 of the stationary disk 90 and the cold water inlet 134 of the rotatable disk 92, all of which are aligned. The cold water flow path Fc continues upward through the cold water cavity 152 of the cap 94, past the aperture in the collar 160 and into the adjacent void 188. Because the slide bolt 168 is spaced a distance from the lower surface 36a of the spindle regulator, the clearance 216 is present which enables the cold water flow path Fc to proceed over the lip 186 of the slide bolt 168 and then down through the 190 aperture and into the slide bolt 168. The cold water flow path Fc continues downward past the spring 164 and the lower edge of the skirt 178 and into the mixing chamber 200. After the cold water in flow path $F_C$ enters the mixing chamber 200, it flows through the central openings 122, 130 in the rotatable and stationary disk 90s and then is discharged from the mixing valve 10 through the mixed water outlets 64, 116 of the base 40 and sub-base 40. Thus, the cold water flow path $F_C$ in the cold water position P4 is generally consistent with that found in the mixed water position P2 (see FIG. 8). When the spindle 52 is rotated and the mixing valve 10 moves from the mixed flow position P2 to the cold water flow position P4, there is an increase in the quantity of water in the cold water flow path $F_C$ through the clearance 216 and into the mixing chamber 200.

Although not shown in the Figures, the mixing valve 10 is moveable to a closed position wherein neither hot water nor cold water can flow into the mixing chamber 200. To arrive at the closed position, the operator actuates the mixing valve 10 whereby the spindle regulator 36 is rotated such that the finger 100 engages the second stop 104*b* of the rotatable disk 92. In this positional arrangement, the hot and cold water inlets 112, 114 of the base 40 are aligned with the hot and cold water inlets 124, 126 in the stationary disk 90. However, the hot and cold water inlets 124, 126 in the stationary disk 90 are misaligned with the hot and cold water inlets 132, 134 in the rotatable disk 92. This misalignment prevents hot and cold water from flowing past the rotatable disk 92 and into the mixing chamber 200.

While the specific embodiments have been illustrated and described, numerous modifications come to mind without significantly departing from the spirit of the invention, and the scope of protection is only limited by the scope of the accompanying Claims.

What is claimed is:

1. A thermostatic water mixing valve comprising:
   a base having a hot water inlet, a cold water inlet and mixed water outlet, the base further having a peripheral sidewall with an upwardly extending engaging member;
   a lower disk positioned on the base, the lower disk having a hot water inlet, a cold water inlet and a central opening, the lower disk further having a peripheral notch that receives a lower portion of the engaging member of the base;
   an upper disk rotatably positioned on the stationary disk, the upper disk having a hot water inlet, a cold water inlet and a central opening, the upper disk further having a peripheral channel that receives an upper portion of the engaging member of the base;
   a cap coupled to the upper disk, wherein the cap and the upper disk rotate as a unit with respect to the lower disk, the cap having a hot water cavity and cold water cavity positioned about a central opening;
   a cartridge assembly; and,
   internal mixing chamber.

2. The thermostatic water mixing valve of claim 1, further comprising a sub-base having a hot water inlet, a cold water inlet and a mixed water outlet, and wherein the sub-base and base are operably coupled together.

3. The thermostatic water mixing valve of claim 1, wherein the cartridge assembly extends through the cap and further comprises:
   a collar with at least one aperture aligned with the cold water cavity of the cap
   the collar having a depending skirt that extends into a central opening of the upper disk, the skirt having at least one aperture aligned with the hot water cavity of the cap;
   a vertically displaceable slide bolt, a spring and temperature sensor positioned within the collar;
   a spindle assembly with a spindle, a spindle regulator and a strut, and wherein the temperature sensor is operably connected to the strut.

4. The thermostatic water mixing valve of claim 1, wherein mixing chamber resides within the slide bolt and the skirt of the collar, wherein the mixing chamber receives both hot water flowing from the hot water cavity through at least one aperture in the skirt and cold water flowing from the cold water cavity through both the aperture in the collar and at least one aperture in the slide bolt, and wherein the mixing chamber discharges mixed water through the mixed water outlets in the base and the sub-base.

5. The thermostatic water mixing valve of claim 4, wherein in a mixed water flow position, an upper lip of the slide bolt is positioned a distance from the spindle regulator to define a clearance, and wherein cold water flows through both the aperture in the collar and the clearance and then into the mixing chamber via the cold water inlet in the slide bolt.

6. The thermostatic water mixing valve of claim 5, wherein in a hot water flow position, the upper lip of the slide bolt engages the spindle regulator whereby the clearance is eliminated and cold water is precluded from flowing through the aperture of the slid bolt and into the mixing chamber, and wherein hot water flows into the mixing chamber through the aperture in the skirt and wherein the hot water is subsequently discharged through the water outlets in the base and the sub-base.

7. The thermostatic water mixing valve of claim 5, wherein in a cold water flow position, a lower edge of the slide bolt obstructs the aperture in the skirt whereby hot water is precluded from flowing through the aperture of the skirt and into the mixing chamber, and wherein cold water flows into the mixing chamber through the aperture in the slide bolt and wherein the cold water is subsequently discharged through the water outlets in the base and the sub-base.

8. The thermostatic water mixing valve of claim 1, wherein the cap has an inner wall and an outer wall, and wherein both the hot water cavity and the cold water cavity are located between the inner and outer walls, and wherein the inner and outer walls extend continuously along a height of the cap.

9. A thermostatic water mixing valve comprising:
   a disk assembly having a lower disk coupled to a base and an upper disk rotatably positioned on the lower disk, wherein each disk has a hot water inlet and a cold water inlet;
   a cap rotatably coupled to the upper disk, the cap having a hot water cavity and cold water cavity;
   a cartridge assembly extending downward through the cap and having a collar with at least one aperture aligned with the cold water cavity of the cap, the collar also having a depending skirt that depends into a central opening of the upper disk, the skirt having at least one aperture aligned with the hot water cavity of the cap, the cartridge assembly further having a vertically displaceable slide bolt and an internal mixing chamber within the collar;
   a hot water flow path that extends through the aligned hot water inlets of the base, the lower disk and the upper disk, and wherein the hot water flow path further extends through both the hot water cavity and the aperture in the skirt and into the mixing chamber; and,
   a cold water flow path that extends through the aligned cold water inlets of the base, the lower disk and the upper disk, and wherein the cold water flow path further extends upward through both the cold water cavity and the aperture in the collar and then downward through at least one internal aperture in the slide bolt; and,
   wherein the hot water flow path and the cold water flow path converge in the mixing chamber to provide a mixed water composition.

10. The thermostatic water mixing valve of claim 9, further comprising a support assembly having a sub-base and a base positioned on the sub-base, the sub-base and base each having a hot water inlet, a cold water inlet and a mixed water outlet, and wherein the support assembly includes a pressure balancing assembly for water entering via the hot and cold water inlets.

11. The thermostatic water mixing valve of claim 10, wherein the sub-base has a cavity with a curvilinear support member that engages a lower half of the pressure balancing assembly and the base has a cavity with a curvilinear support member that engages an upper half of the pressure balancing assembly, and wherein the pressure balancing assembly is operably supported between the sub-base and the base.

12. The thermostatic water mixing valve of claim 10, wherein the cartridge assembly comprises:
a spring and temperature sensor positioned within the collar, and
a spindle assembly having an elongated spindle, a spindle regulator and a strut, wherein the temperature sensor is operably connected to the strut.

13. The thermostatic water mixing valve of claim 12, wherein in a mixed water flow position, an upper lip of the slide bolt is positioned a distance from the spindle regulator to define a clearance, and wherein cold water flow path extends through the clearance and then into the mixing chamber via the cold water inlet in the slide bolt.

14. The thermostatic water mixing valve of claim 9, wherein the base includes an engaging member that extends upwardly from a peripheral sidewall of the base.

15. The thermostatic water mixing valve of claim 14, wherein the lower disk includes a peripheral notch that receives a lower portion of the engaging member of the base.

16. The thermostatic water mixing valve of claim 15, wherein the lower disk has a central opening residing radially inward of the hot and cold water intakes, and wherein the mixed water from the mixing chamber is discharged through the central opening.

17. The thermostatic water mixing valve of claim 14, wherein the upper disk includes a peripheral channel that receives an upper portion of the engaging member of the base during rotational movement of the upper disk.

18. The thermostatic water mixing valve of claim 17, wherein the upper disk has a central opening residing radially inward of the hot and cold water intakes, and wherein the mixed water from the mixing chamber is discharged through the central opening.

19. The thermostatic water mixing valve of claim 9, wherein the cap has an inner wall and an outer wall, and wherein both the hot water cavity and the cold water cavity are located between the inner and outer walls, and wherein the inner and outer walls extend continuously along a height of the cap.

20. A thermostatic water mixing valve comprising:
a disk assembly having a lower disk coupled to the base and an upper disk rotatably positioned on the lower disk, wherein each disk has a hot water inlet and a cold water inlet;
a cap rotatably coupled to the upper disk, the cap having a hot water cavity and cold water cavity;
a cartridge assembly extending downward through the cap and comprising:
a collar with at least one aperture aligned with the cold water cavity of the cap, the collar having a depending skirt with at least one aperture aligned with the hot water cavity of the cap,
a vertically displaceable slide bolt operably connected to a temperature sensor, wherein the slide bolt resides within an upper portion of the collar;
a spindle assembly with a spindle, a spindle regulator and a temperature sensor strut;
an internal, hot and cold water mixing chamber; and,
wherein in a mixed water flow position, an upper lip of the slide bolt is positioned a distance from the spindle regulator to define a clearance, and wherein cold water flows from the cold water cavity through both the aperture in the collar and the clearance and then into the mixing chamber via the cold water inlet in the slide bolt, and wherein hot water flows from the hot water cavity through at least one aperture in the skirt and into the mixing chamber.

21. The thermostatic water mixing valve of claim 20, wherein the hot water and the cold water converge in the mixing chamber to form a mixed water composition that is subsequently discharged through the water outlets in the base and the sub-base.

22. The thermostatic water mixing valve of claim 20, wherein in a hot water flow position, the upper lip of the slide bolt engages the spindle regulator whereby the clearance is eliminated and cold water is precluded from flowing through the aperture of the slid bolt and into the mixing chamber, and wherein hot water flows into the mixing chamber through the aperture in the skirt and wherein the hot water is subsequently discharged through the water outlets in the base and the sub-base.

23. The thermostatic water mixing valve of claim 20, wherein in a cold water flow position, a lower edge of the slide bolt obstructs the aperture in the skirt whereby hot water is precluded from flowing through the aperture of the skirt and into the mixing chamber, and wherein cold water flows into the mixing chamber through the aperture in the slide bolt and wherein the cold water is subsequently discharged through the water outlets in the base and the sub-base.

24. The thermostatic water mixing valve of claim 20, further comprising a support assembly having a sub-base and a base positioned on the sub-base, the sub-base and base each having a hot water inlet, a cold water inlet and a mixed water outlet.

25. The thermostatic water mixing valve of claim 24, wherein the base includes an engaging member that extends upwardly from a peripheral sidewall of the base, the engaging member comprising a pedestal and a finger extending from the pedestal.

26. The thermostatic water mixing valve of claim 25, wherein the lower disk includes a central opening and peripheral notch that receives the pedestal, and wherein the upper disk includes a peripheral channel that receives the finger during rotational movement of the upper disk.

27. The thermostatic water mixing valve of claim 20, wherein a hot water flow path extends through the aligned hot water inlets of the sub-base, the base, the lower disk and the upper disk, and wherein the hot water flow path further extends through both the hot water cavity and the aperture in the skirt and into the mixing chamber.

28. The thermostatic water mixing valve of claim 27, wherein a cold water flow path extends through the aligned cold water inlets of the sub-base, the base, the lower disk and the upper disk, and wherein the cold water flow path further extends upward through both the cold water cavity and the aperture in the collar and then downward through the aperture in the slide bolt and into the mixing chamber.

29. The thermostatic water mixing valve of claim 20, wherein the cap has an inner wall and an outer wall, and wherein both the hot water cavity and the cold water cavity are located between the inner and outer walls, and wherein the inner and outer walls extend continuously along a height of the cap.

30. A thermostatic water mixing valve comprising:
a disk assembly having a lower disk coupled to the base and an upper disk rotatably positioned on the lower disk, wherein each disk has a hot water inlet and a cold water inlet;

a cap rotatably coupled to the upper disk, the cap having a hot water cavity and cold water cavity, wherein the hot water cavity is radially inward of an outer cap wall and coincident with an inner cap wall, and wherein the cold water cavity is radially inward of the outer cap wall and radially outward of the inner cap wall.

31. The thermostatic water mixing valve of claim 30, wherein the cap has a top wall extending between the inner and outer cap walls, and wherein the top wall bounds the upper region of the hot water cavity.

32. The thermostatic water mixing valve of claim 31, wherein the cold water cavity extends through the top wall of the cap.

33. The thermostatic water mixing valve of claim 30, further comprising a cartridge assembly extending downward through the cap and having a collar with at least one aperture aligned with the cold water cavity of the cap, the collar having a depending skirt with at least one aperture aligned with the hot water cavity of the cap.

34. The thermostatic water mixing valve of claim 33, wherein the cartridge assembly further includes:

a vertically displaceable slide bolt operably connected to a temperature sensor, wherein the slide bolt resides within an upper portion of the collar; and, a spindle assembly with a spindle, a spindle regulator and a temperature sensor strut.

35. The thermostatic water mixing valve of claim 34, wherein in a mixed water flow position, an upper lip of the slide bolt is positioned a distance from the spindle regulator to define a clearance, and wherein cold water flows from the cold water cavity of the cap through both the aperture in the collar and the clearance and then into an internal mixing chamber via a cold water inlet in the slide bolt, and wherein hot water flows from the hot water cavity of the cap through at least one aperture in the skirt and into the mixing chamber.

* * * * *